United States Patent

[11] 3,632,281

[72] Inventors Georgy Alexandrovich Ilyashenko
prospect Mira, 34, kv. 33;
Vilyam Efimovich Laventman, ulitsa
Generala Petrova, 21, kv. 69; Nikolai
Iosifovich Lichman, ulitsa Stolbojaya, 19,
kv. 30, all of, Odessa; Iosif Moiseevich
Rabinovich, ulitsa Dzerzhinskogo, 75, kv.
6, Khmelnitsky; Nikolai Yakovlevich
Ryaboi, ulitsa Novoselov, 31, kv. 57;
Andrei Lukyanovich Lugovskoi, both of
Odessa, all of U.S.S.R.
[21] Appl. No. 850,037
[22] Filed Aug. 14, 1969
[45] Patented Jan. 4, 1972
[32] Priority Sept. 4, 1968
[33] U.S.S.R.
[31] 1267679

[54] PLASTIC-MOLDING MACHINE
3 Claims, 3 Drawing Figs.

[52] U.S. Cl. .................................................... 425/450
[51] Int. Cl. .................................................... B29f 1/00,
B30b 1/16

[50] Field of Search.......................................... 18/30 LT

[56] References Cited
UNITED STATES PATENTS

| | | | |
|---|---|---|---|
| 2,113,115 | 4/1938 | MacMillin et al............ | 18/30 LT |
| 2,848,770 | 8/1958 | Schuchardt ................. | 18/30 LT UX |
| 2,969,818 | 1/1961 | Allard ......................... | 18/30 LT UX |
| 3,335,463 | 8/1967 | Allard et al.................. | 18/30 LT |
| 3,513,506 | 5/1970 | Meingast..................... | 18/30 LT |

FOREIGN PATENTS

| 1,021,126 | 2/1966 | Great Britain................ | 18/30 LT |

Primary Examiner—J. Howard Flint, Jr.
Attorney—Waters, Roditi, Schwartz & Nissen ABSTRACT: A plastic-molding machine with a hydromechanical mold-clamping device whose leverage system comprises a pusher with a rigid stop. The machine is adapted for processing all known kinds of plastic materials by injection-molding and flow-molding methods, and allows the molded article to be degassed while it is in the mold.

PLASTIC-MOLDING MACHINE

The present invention relates to equipment for processing plastic materials and more specifically it relates to machines for processing thermoplastic and thermosetting plastics by injection-molding and flow-molding methods.

Known in the art are plastic-molding machines comprising a hydromechanical device for closing an associated mold, said machines processing the thermoplastic materials by an injection-molding method (see, for example British Patent No. 871,637, Cl 87(2), 1959).

In the known machines, a portion of the molten molding compounds is delivered under a certain pressure from the injection mechanism into a clamped mold where it is molded to shape and cooled. The mold is clamped prior to injection and opened after cooling of the molded article by a hydromechanical device. However, the known plastic-molding machines have a number of disadvantages.

The articles, especially thin-walled ones, molded in these machines are characterized by high residual stresses near the zone of the inlet passage. This impairs considerably the quality of the article, particularly its heat resistance, that is the ability to retain its original shape at elevated temperatures. This increases substantially the duration of the molding cycle owing to a longer time required for cooling the molded article in the mold, since in this case the article must be cooled in the mold to a lower temperature than usually prescribed.

Additionally, in the molding of solid articles, it becomes difficult to sufficiently make up for the shrinkage of the plastic material so that the finished articles turn out to be porous with internal cavities. For the same reason, it is difficult to manufacture articles with the walls differing widely in thickness.

Another disadvantage of the known machines lies in that materials with a high contact of volatile matter, for example thermosetting plastics, are difficult to handle in these machines owing to the impossibility of taking away gases directly from the closed mold.

All these disadvantages limit considerably the field of application of the known machines and cut down their output.

The production of high-quality articles of various shapes both from the thermoplastic and thermosetting materials and a gain in the output are made possible by resorting to the flow-molding method.

Said flow-molding method consists in filling a partly closed but sealed-off mold with molten molding compound after which the article is finally molded by the mold proper when it is closed.

To realize this method, the mold-clamping device must insure accurate stopping of the movable half-mold in a preset intermediate position and prevent opening of the mold by the force originated in it while it is being filled with the molding compound, and, finally, to allow the movable half-mold to continue its movement until the mold is completely closed by a preset force. The known machines whose hydromechanical mold-clamping device comprises a leverage system are not suitable for the use of said method since they fail to stop the movable half-mold in a preset intermediate position with a required degree of accuracy and to insure a sufficient power of fixing.

While materials with a high content of volatiles, for example thermosetting materials, are processed by the injection-molding method, it becomes necessary to have the molded article degassed while it is still in the mold. For this purpose, the mold-clamping device must close the mold with a full force prior to the molding compound injection into the mold, and then provide to relieve fully or partly the force applied to the mold after which the latter must be clamped again for molding the article. If necessary, the articles can be degassed several times within a single cycle. The known machines with a hydromechanical mold-clamping device also fail to insure this operation.

An object of the present invention resides in eliminating the aforesaid disadvantages.

Another main object of the invention resides in providing a plastic-molding machine with a hydromechanical mold-damping device, said machine insuring accurate fixing of the movable half-mold in an intermediate position with a possibility of its further automatic movement and the mold is automatic unloading to a required extent.

This object is achieved by providing a plastic-molding machine wherein the hydromechanical mold-clamping device comprises a leverage system, the mold-clamping device being provided with a hydraulically-operated pusher interacting with one of the links of the leverage system, mostly with its driving link, there being a rigid stop limiting its movement.

It is preferred that the pusher be made in the form of a floating piston built into the hydraulic cylinder of the mold-clamping device.

It is also preferred that the floating plunger stop be made in the form of an axially adjustable rod extending through the hydraulic cylinder cover and having a shoulder which interacts with the circular projection of the floating plunger.

The invention will next be described in detail by way of example with reference to the accompanying drawings, in which.

Figure 1:
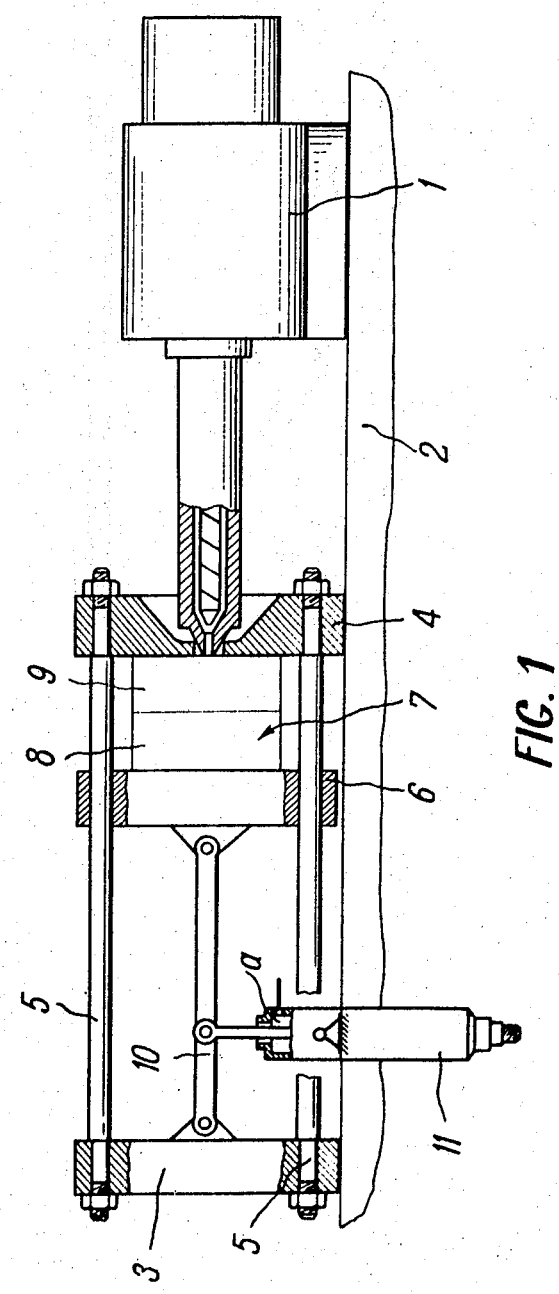
FIG. 1 illustrates a longitudinal section of the plastic-molding machine, according to the invention.
Figure 2:
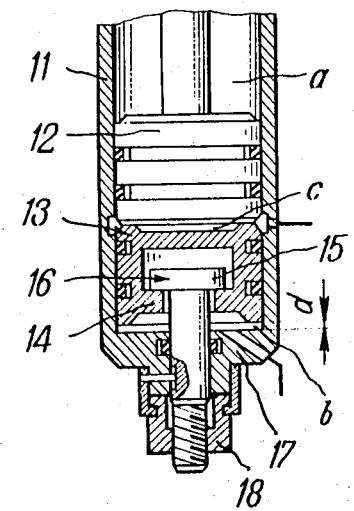
FIG. 2 is a section through the hydraulic cylinder of the mold-clamping device with the plunger extended into the cylinder cavity, according to the invention.

The plastic-molding machine comprises a plastication mechanism 1 (FIG. 1), a frame 2 which supports all the units and devices, and a mold-clamping device consisting of two stationary plates 3 and 4 interconnected by pins 5 on which a movable plate 6 slides. Installed on the movable plate 6 and on the stationary plate 4 is a mold 7 consisting of a movable half-mold 8 and a stationary half-mold 9. The movable plate 6 is moved by a crank-and-lever mechanism 10 powered by a hydraulic cylinder 11 with a piston 12 (FIG. 2). Built into the butt end of the hydraulic cylinder 11 is a pusher fashioned as a floating plunger 13 whose circular projection 14 interacts with a shoulder 15 of a rod 16 which extends through the cover 17 of the hydraulic cylinder 11 and can be adjusted axially by means of a nut 18.

The plastic-molding machine for processing plastics by the flow-molding method functions as follows.

Figure 3:
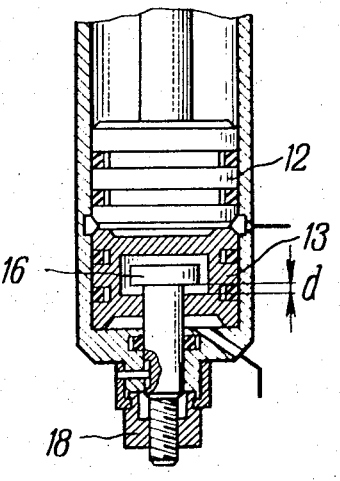
FIG. 3 is a view corresponding to FIG. 2 with the plunger in the rearmost position, according to the invention.

The working fluid is fed into the spaces $a$ and $b$ of the hydraulic cylinder 11 (FIGS. 1 and 2) while the space $c$ is put in communication with the return line. The piston 12 moves (FIG. 2) until it touches or comes in contact with the floating plunger 13 extended into the cylinder cavity for a distance $d$, this distance being set by an adjustable rod 16 to suit a required clearance between the half-molds 8 and 9 (FIG. 1). At this stage, the mold 7 is preliminarily closed. After the molten molding compound has been injected into the mold 7, the space $b$ of the hydraulic cylinder 11 (FIG. 2) is put into communication with the return line. The piston 12 takes up the clearance $d$ (FIGS. 2 and 3), moving the movable plate 6 (FIG. 1) with the movable half-mold 8 by the leverage system 10 until the mold 7 is clamped by a preset force so that the article is additionally pressed and molded. After the article cools down in the mold 7 the space $c$ of the hydraulic cylinder 11 (FIG. 2) is filled with the working fluid while the space $a$ of the hydraulic cylinder 11 communicates with the return line. Moving upwards, the piston 12 interacts by its rod with the leverage system 10 (FIG. 1) and shifts the movable plate 6 together with the movable half-mold 8 to the left over the pins 5 thus opening the mold 7.

The plastic-molding machine for processing plastic materials by the injection molding method with degassing of the molded article functions as follows.

The working fluid is fed into the space $a$ of the hydraulic cylinder 11 (FIGS. 1 and 2), the spaces $c$ and $b$ (FIG. 2) communicate with the return line. The piston 12 moves all the way to bear by the plunger 13 against the cover 17 of the hydraulic cylinder 11. The movement of the piston 12 is transmitted by the leverage system 10 (FIG. 1) onto the movable plate 6 with the movable half-mold 7 both of which slide over the pins 8 to the right, thus closing the mold 7 by the full force.

To have the molded article degassed in the mold 7, the working fluid is fed into the space $b$ of the hydraulic cylinder 11 (FIG. 2) under the floating plunger 13 which, owing to the fact that its effective area is larger than that in the space $a$, moves the piston 12 through a distance $d$ which is set by the position of the adjustable rod 16. The leverage system 10 (FIG. 1) moves the plates 3 and 6 towards each other thus diminishing the distance between them for a value which does not exceed the value of deformation of the pins 5 which takes place during complete clamping of the mold 7. Thus the mold 7 is completely or partly unloaded without being opened. Owing to this, the gases contained in the mold under a certain pressure escape from the mold, Then the space $b$ of the hydraulic cylinder 11 (FIG. 2) is put into communication with the return line, and the mold 7 is again clamped by the full force. If necessary, the molded article may be degassed several times during one cycle.

After the molded article has cooled down inside the mold 7, the working fluid is fed into the space $c$ of the hydraulic cylinder 11. The space $a$ communicates with the return line and the mold opens.

While processing the plastic materials by the injection-molding method, the provision in the butt end of the hydraulic cylinder 11 of the floating plunger 13 which can be used as an adjustable stop makes it possible to control, with a sufficiently high degree of accuracy, the mold-clamping force towards its reduction which becomes necessary in the case of the molds designed to carry small loads. For this purpose, the rod 16 should be extended as required and the working fluid should be fed under the service pressure into the space $b$. In this case, clamping of the mold will take place with the leverage system 10 (FIG. 1) in a partly straightened state and, consequently, by a smaller force.

The plastic-molding machine, according to the invention, is adapted for processing all known plastic materials by the injection-molding and flow-molding methods, and allows the molded article to be degassed while it is in the mold. The use of said machine for producing articles by the flow-molding method increases its output along with a substantial improvement of the quality of the molded products. The mold-clamping device comprising a single cylinder imparts such properties to the machine as high speed, reliability and ease of servicing. A high rigidity of the mold-clamping device insures the production of precision-dimensioned articles. The adjustable stop in the butt end of the hydraulic cylinder makes it possible while using the injection molding method, to control the mold-clamping force with a high degree of accuracy.

What is claimed is:

1. A molding machine for plastic materials comprising a mold including a first stationary part and a second movable part, a leverage system connected to the movable part for movement towards and away from the stationary part, and hydraulic cylinder means connected to said leverage system to operate the same to move the first movable part, said hydraulic cylinder means comprising a cylinder, a double-acting piston slidable in said cylinder under the pressure of a fluid introduced into the cylinder, said cylinder having opposite ends, a floating plunger in said cylinder at one of said ends, an adjustable rod fixed at said one end of the cylinder and engageable with said plunger to permit limited axial movement thereof in said cylinder, means sealing said plunger in said cylinder as a second piston-like member, and means for introducing a pressure fluid into said cylinder selectively on one side of the plunger, on one side of the piston, and between the piston and plunger, said rod being secured in said cylinder to limit movement of the plunger away from said one end of the cylinder and provide a predetermined clearance therebetween.

2. A machine as claimed in claim 1 wherein said plunger has a recess and said adjustable rod includes a shoulder which travels in said recess as the plunger is displaced in said cylinder.

3. A machine as claimed in claim 2 wherein said rod is threadably engaged in said cylinder.

* * * * *